US012577169B2

(12) United States Patent
Priestley et al.

(10) Patent No.: US 12,577,169 B2
(45) Date of Patent: Mar. 17, 2026

(54) ULTRA-LIGHTWEIGHT GRAPHENE-HBN NANOPARTICLE AEROGELS

(71) Applicants: The Trustees of Princeton University, Princeton, NJ (US); Lutai, Jining Shandong (CN)

(72) Inventors: Rodney D. Priestley, Princeton, NJ (US); Craig B. Arnold, Skillman, NJ (US); Hejun Li, Jining Shandong (CN); Sehmus Ozden, Princeton, NJ (US)

(73) Assignees: The Trustees of Princeton University, Princeton, NJ (US); SHANDONG LUTAI HOLDING GROUP CO. LTD, Jining Shandong (CN)

( * ) Notice: Subject to any disclaimer, the term of this patent is extended or adjusted under 35 U.S.C. 154(b) by 533 days.

(21) Appl. No.: 17/621,798

(22) PCT Filed: Jan. 20, 2021

(86) PCT No.: PCT/US2021/014128
§ 371 (c)(1),
(2) Date: Dec. 22, 2021

(87) PCT Pub. No.: WO2021/150569
PCT Pub. Date: Jul. 29, 2021

(65) Prior Publication Data
US 2022/0348507 A1 Nov. 3, 2022

Related U.S. Application Data

(60) Provisional application No. 63/039,792, filed on Jun. 16, 2020, provisional application No. 62/963,815, filed on Jan. 21, 2020.

(51) Int. Cl.
| | |
|---|---|
| *C04B 35/583* | (2006.01) |
| *C04B 35/532* | (2006.01) |
| *C04B 35/622* | (2006.01) |
| *C04B 35/624* | (2006.01) |
| *C04B 35/64* | (2006.01) |

(52) U.S. Cl.
CPC .......... *C04B 35/583* (2013.01); *C04B 35/532* (2013.01); *C04B 35/62222* (2013.01);
(Continued)

(58) Field of Classification Search
None
See application file for complete search history.

(56) References Cited

U.S. PATENT DOCUMENTS

| | | |
|---|---|---|
| 7,618,608 B1 | 11/2009 | Keller, Sr. |
| 7,750,056 B1 | 7/2010 | Daoud |
| | (Continued) | |

OTHER PUBLICATIONS

Wang et al., Lightweight, superelastic yet thermoconductive boron nitride nanocomposite aerogel for thermal energy regulation, ACS Nano 2019 (Wang) (Year: 2019).*
(Continued)

*Primary Examiner* — Keling Zhang
(74) *Attorney, Agent, or Firm* — Meagher Emanauel Laks Goldberg & Liao, LLP

(57) ABSTRACT

Ultra-lightweight aerogels and methods for fabricating such aerogels from ammonia borane and a support structure, where the support structure is either two-dimensional nanostructures, or hydrocarbon polymer colloids. The components are mixed, then annealed. The properties of the disclosed aerogels can be tuned by controlling the ratio between the support structure and the ammonia borane, or by infiltrating the aerogels with additives.

14 Claims, 6 Drawing Sheets

(52) U.S. Cl.
CPC ............ *C04B 35/624* (2013.01); *C04B 35/64* (2013.01); *C04B 2235/386* (2013.01); *C04B 2235/422* (2013.01); *C04B 2235/5436* (2013.01); *C04B 2235/77* (2013.01)

(56) References Cited

U.S. PATENT DOCUMENTS

| | | |
|---|---|---|
| 9,040,339 B2 | 5/2015 | Pen |
| 9,605,363 B2 | 3/2017 | Zhang et al. |
| 2012/0301360 A1 | 11/2012 | Meinhold et al. |

OTHER PUBLICATIONS

Qian et al., Ultralight, high-surface-area, multifunctional graphene-based aerogels from self-assembly of graphene oxide and resol, Carbon, 2014 (Year: 2014).*

Rousseas et al., Synthesis of highly crystalline sp2-bonded boron nitride aerogels, ACS Nano, 2013 (Year: 2013).*

Frueh et al., Pyrolytic decomposition of ammonia borane to boron nitride, Inorg. Chem., 2011 (Year: 2011).*

Defriend et al., Templating silica aerogel with polystyrene to improve their mechanical properties, Fusion Science and Technology, 2017 (Year: 2017).*

Jing et al., Synthesis of polystyrene particles with precisely controlled degree of concaveness, Polymers, 2018 (Year: 2018).*

Tay et al., Lightweight, superelastic boron nitride/polydimethylsiloxane foam as air dielectric substitute for multifunctional capacitive sensor applications, Adv. Funct. Mater., Jan. 8, 2020 (Year: 2020).*

International Search report and Written Opinion for corresponding PCT Application No. PCT/US2021/014128, dated Aug. 6, 2021.

Ozden et al., "Interfacial Engineering to Tailor the Properties of Multifunctional Ultralight Weight HBV-Polymer Composite Aerogels", ACS Applied Materials & Interfaces, Mar. 9, 2021.

* cited by examiner

30 μm

ULTRA-LIGHTWEIGHT GRAPHENE-HBN NANOPARTICLE AEROGELS

CROSS-REFERENCE TO RELATED APPLICATIONS

This application is a National Stage Entry of Patent Cooperation Treaty Application No. PCT/US2021/014128, filed Jan. 20, 2021, which claims priority to U.S. Provisional Application Nos. 62/963,815, filed Jan. 21, 2020, and 63/039,792, filed Jun. 16, 2020. Each of the aforementioned applications is expressly incorporated herein by reference in their entirety.

BACKGROUND

Most polymers, plastics, textiles, and wood are intrinsically flammable because of their organic nature, which makes them easily ignited by external heat or fire sources. Upon combustion they can release a large quantity of heat, smoke, and toxic gases during combustion. Thus, they have a huge threat human safety and property. Therefore, industry has developed various additives such as halogen- and phosphorus-based materials to be incorporated into polymers for addressing these issues. Yet, these conventional flame retardants are progressively being phased out because of the toxic outcomes to environment and health issues during combustion. In addition, some epoxy-resin and inorganic salts (e.g., alumina and borate) can provide excellent flame-retardant properties, but they have very poor laundering durability. Aerogels may offer an alternative path forward.

Most aerogels are made from ceramic materials, such as silica, alumina and carbide, and hence they are very dense, brittle an not flexible in extreme environmental applications. Two-dimensional (2D) layered nanostructures such as graphene, graphene oxide (GO) and h-BN have promising potential in future technologies including extreme environmental applications because they can withstand high temperature, harsh chemical environments and corrosion. Although it has been more than a decade since 2D-layered material-based aerogels with polymer composites have been investigated, fundamental challenges such as poor load transfer, good interfacial engineering and dispersion still remain as a big bottleneck that needs to be overcome for the commercialization of these materials.

Therefore, aerogels and techniques for forming aerogels that can be used in high temperature or harsh chemical environments are desirable.

BRIEF SUMMARY

Disclosed herein are ultralight weight, environmentally-friendly heat-resistant and fire-safe aerogels and composites from the assembly of two-dimensional layered materials and polymer colloids, and methods for synthesizing 2D nanostructured based ultra-lightweight, fire-resistant aerogels and composites thereof.

The method for creating an aerogel generally comprises at least three steps: (i) mixing solid ammonia borane and a support structure, where the support structure is either (a) a two-dimensional nanostructured material or (b) hydrocarbon polymer colloids; (ii) allowing the mixture to self-assemble to form a plurality of hybrid particles; and (iii) annealing the plurality of hybrid particles at a first temperature to form the aerogel.

Optionally, the method may also include determining the ratio of the amount of support structure to the amount of ammonia borane used to prepare the aerogel based on a target density (such as no more than about 11 mg/cm$^3$) of the aerogel.

Optionally, the method may also include altering at least one property of the aerogel by allowing at least one chemical agent, such as polydimethylsiloxane (PDMS) to infiltrate the aerogel.

In various embodiments, the two-dimensional nanostructured material is graphene, a transition metal dichalcogenide, or an MXene. In various embodiments, the hydrocarbon polymer is polystyrene.

In some embodiments, the support structure is spherical. In some embodiments, the support structure is non-spherical.

In various embodiments, the annealing includes providing nitrogen at first temperature of between 1000 and 1500 degrees C. In some embodiments, the annealing also includes providing air at between 500 and 700 degrees C.

In various embodiments, the average particle size of the hybrid particles is less than 30 μm.

A second aspect is drawn to an aerogel. The aerogel comprises a plurality of colloidal nanoparticles containing two-dimensional nanostructured material and hexagonal boron nitride (hBN).

In various embodiments, the two-dimensional nanostructured material is graphene, a transition metal dichalcogenide, or an MXene. In various embodiments, the aerogel comprises at least one additional additive (such as PDMS).

In various embodiments, the two-dimensional nanostructured material is doped by B and N atoms.

Optionally, the aerogel may be configured for use as a coating or as a structural component.

BRIEF DESCRIPTION OF DRAWINGS

Embodiments of the invention are further described hereinafter with reference to the accompanying drawings, in which.

DETAILED DESCRIPTION

A useful aerogel may be manufactured using at least a three-step method. This can be best understood with reference to FIG. 1.

The first step of the method 100 the mixing 110 of solid ammonia borane 111 and a support structure 112.

Ammonia borane is well-known in the art. Ammonia borane (AB), also referred to as borazane, has been investigated as an energy-dense source of hydrogen. Methods of synthesis of ammonia borane are well-known. For example, one process involves reacting a metal borohydride (e.g., sodium borohydride) with an ammonia salt (e.g., ammonium carbonate), in a suitable solvent (e.g., an ether solvent, such as tetrahydrofuran or dioxane), then filtered and placed under vacuum to yield solid ammonia borane. High purity ammonia borane is available commercially.

The support structure will fall into one of two categories of materials: either (a) a two-dimensional nanostructured material or (b) hydrocarbon polymer colloids. Such support structures can be used for controlling the geometry and size of pores.

In some embodiments, the support structure is spherical. In some embodiments, the support structure is non-spherical, including but not limited to cubic, rod, and star shapes.

Typically, two-dimensional compounds are in a form which is single- or few layers thick, i.e., up to 10 molecular layers thick. A two-dimensional crystal of a layered material (e.g., an inorganic compound or graphene) is a single or few layered particle of that material.

Non-limiting examples of suitable two-dimensional materials include (i) graphene or graphene oxide; (ii) transition metal dichalcogenides, including those having the formula $MX_2$, where M is molybdenum, tungsten, or niobium, and X is sulfur, selenium, or tellurium, such $NbSe_2$, $MoS_2$, $WS_2$, $WSe_2$, $MoTe_2$; and (iii) few-layered MXenes (i.e., MXenes with fewer than 5 layers) including 2-1 MXenes such as $Ti_2C$, $(Ti_{0.5}, Nb_{0.5})_2C$, $V_2C$, $Nb_2C$, $Mo_2C$, $Mo_2N$, $Ti_2N$, $W_{1.33}C$, $Nb_{1.33}C$, $Mo_{1.33}C$, $Mo_{1.33}Y_{0.67}C$; 3-2 MXenes such as $Ti_3C_2$, $Ti_3CN$, $Zr_3C_2$, $Hf_3C_2$; 4-3 MXenes such as $Ti_4N_3$, $Nb_4C_3$, $Ta_4C_3$, $V_4C_3$, $(Mo,V)_4C_3$; 5-4 MXenes such as $Mo_4VC_4$; and Double transition metal MXenes, including 2-1-2 MXenes such as $Mo_2TiC_2$, $Cr_2TiC_2$, $Mo_2ScC_2$; and 2-2-3 MXenes such as $Mo_2Ti_2C_3$.

The hydrocarbon polymer may be any appropriate hydrocarbon polymer, including polystyrene, polyethylene, and/or polypropylene. In preferred embodiments using hydrocarbon polymers, the hydrocarbon polymer is polystyrene.

Figure 2:
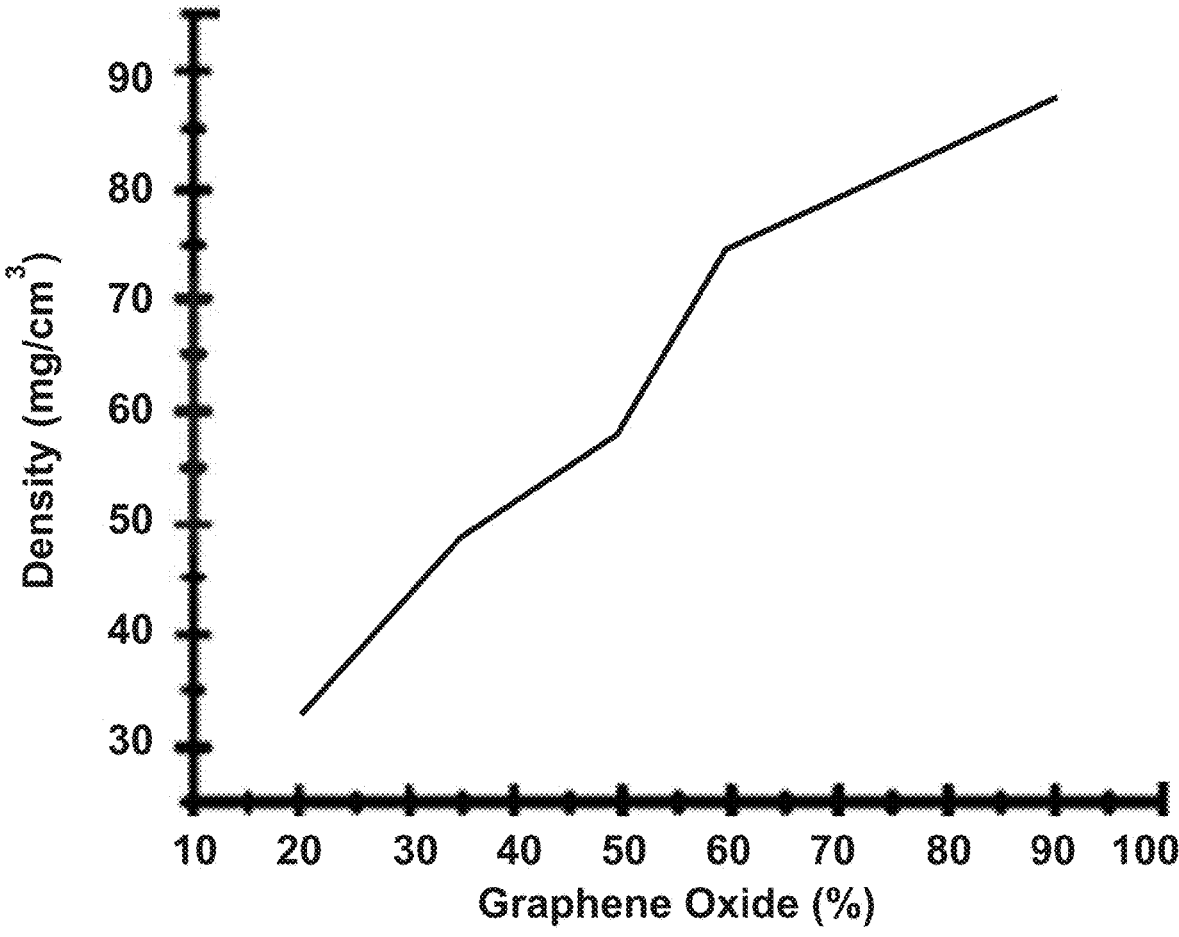
FIG. 2 is a graph illustrating the impact of the percent of graphene oxide on the density of the resulting aerogel.

Optionally, the method may also include determining the ratio of the amount of support structure to the amount of ammonia borane used to prepare the aerogel based on a target density (such as no more than about 50 mg/cm³, no more than 40 mg/cm³, no more than 30 mg/cm³, no more than 20 mg/cm³, or no more than 11 mg/cm³) of the aerogel. As expected, as the material used for the support structure changes, the ratios necessarily change as well. See, e.g., FIG. 2. In some embodiments, the properties of the resulting aerogels can be tuned by controlling the ratio between the components, e.g., graphene and ammonia borane.

In various embodiments, the average particle size of the support structure is less than 30 μm. In some embodiments, the average particle size of the support structure is ≤30 μm, ≤25 μm, ≤20 μm, ≤15 μm, ≤10 μm, ≤5 μm, or ≤1 μm. Methods for measuring particle size, even of non-spherical particles, are known to skilled artisans. For example, one approach provides the diameter of a sphere that has the same surface area of a given particle.

Figure 1:
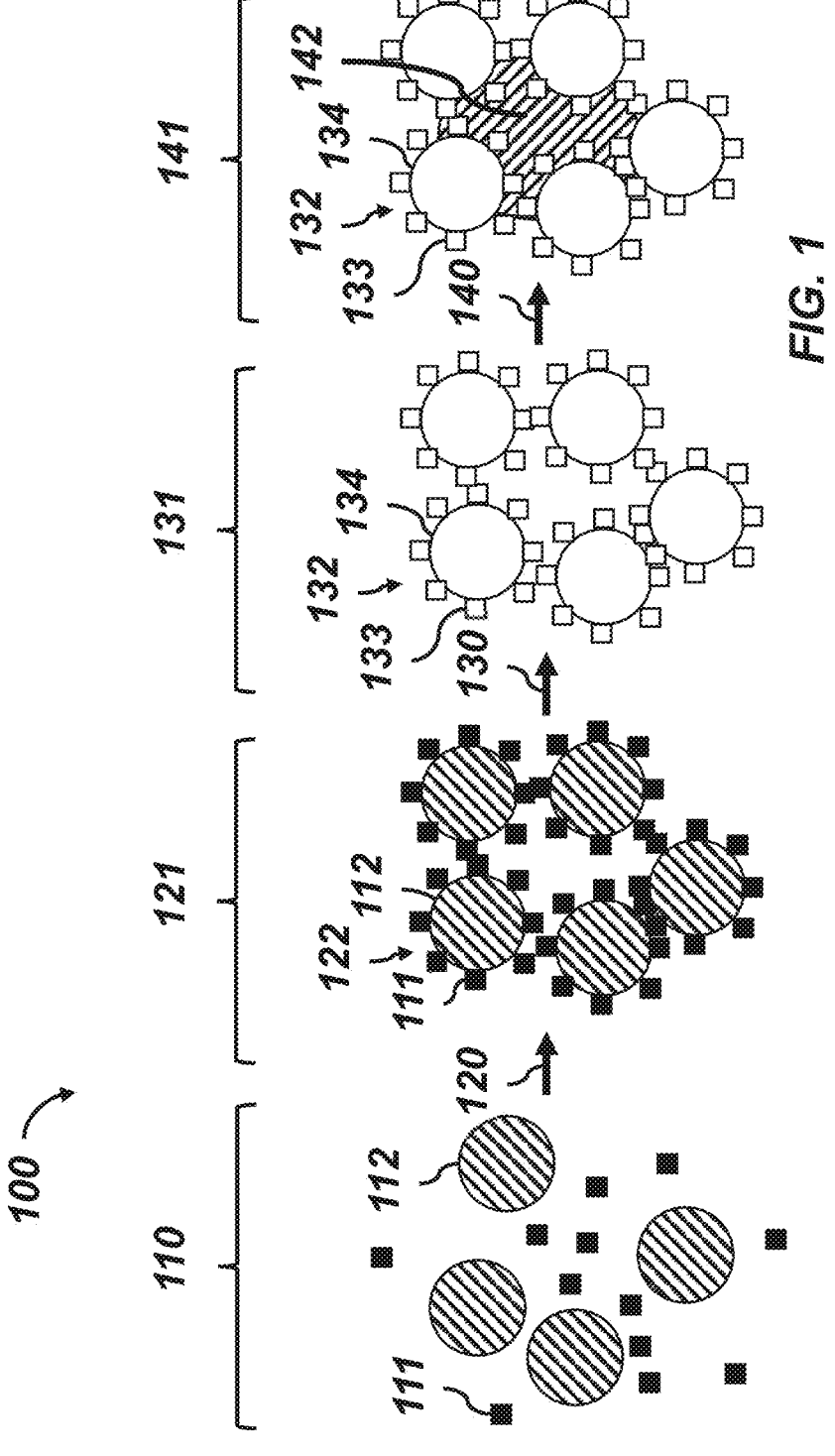
FIG. 1 is a simplified illustration of the disclosed method for forming an aerogel.

Referring back to FIG. 1, the second step is to allow 120 the solid ammonia borane 111 and support structure 112 mixture to self-assemble to form a plurality 121 of hybrid particles 122. Generally, as seen in FIG. 1, this will involve the solid ammonia borane 111 assembling around each particle or element of the support structure 112, as the support structures attempt to arrange themselves into some compact form.

In various embodiments, the average particle size of the hybrid particles is less than 30 μm. In some embodiments, the average particle size of the hybrid particles is ≤30 μm, ≤25 μm, ≤20 μm, ≤15 μm, ≤10 μm, ≤5 μm, or ≤1 μm.

Figure 3:
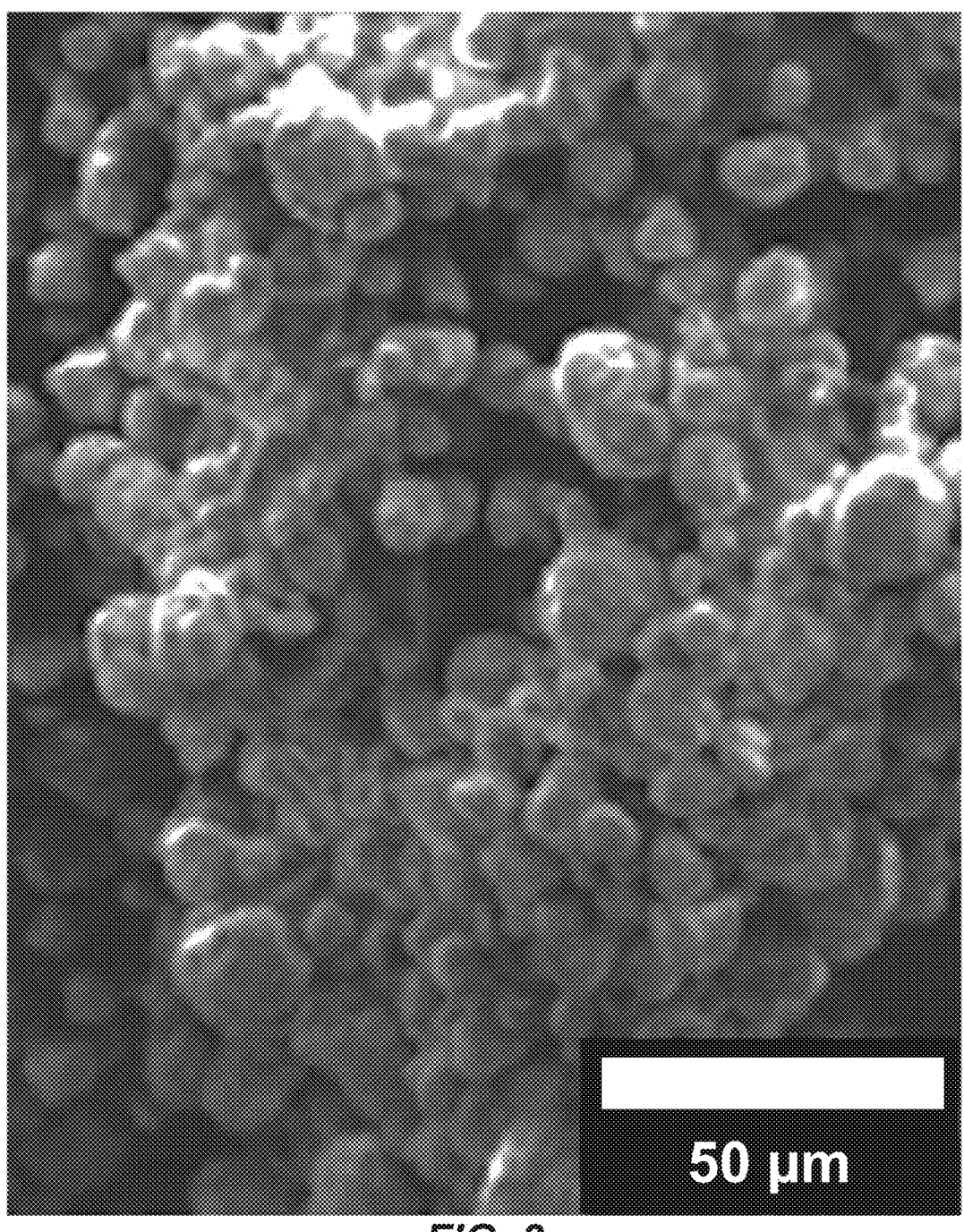
FIG. 3 is a Scanning Electron Microscope image of hybrid particles of graphene oxide and ammonia borate.

Note that the ammonia borane and support structure should be chosen such that there are attractive interactions between the two components. For example, consider a system using graphene oxide and ammonia borane. Graphene oxide is negatively charged due to the oxygen containing groups and ammonia borane is both negatively and positively charged molecule. As a result of the electrostatic charge and other interactions (e.g., Van der Waals, hydrogen bonding), the two components interact and form particles as shown in scanning electron microscope images (see FIG. 3).

The third step is to anneal 130 the hybrid particles to form the hBN aerogel 131.

The annealing process may alter the pore structures formed through self-assembly. For example, graphene oxide is 2D-sheet and mixing it with ammonia borane forms spherical and irregular oval shaped structure, which after annealing turns to a spherical structure.

The annealing process generally involves first annealing at a first temperature that is greater than 900 degrees C., and preferably between 1000 and 1500 degrees C., such as at least 1000, 1050, 1100, 1200, 1300, or 1400 degrees C., and no more than 1500, 1400, 1300, 1200, 1150, or 1100 degrees C., including all subranges and combinations thereof.

Generally, the first annealing process is done in the presence of a gas, and preferably an inert gas, such as nitrogen. In some preferred embodiments, nitrogen is provided at a temperature of between 1050 and 1150 degrees.

The first annealing process is generally done for a first period of time that is at least six hours, preferably between 6 and 24 hours, more preferably between 10 and 16 hours, and most preferably between 11 and 13 hours. The time required is based on the temperature used; the annealing process converts the ammonia borane to hBN. If the time/temperature combination is insufficient, it will be amorphous BN. Annealing at higher temperatures requires less time to complete the conversion and crystallization required.

In one example, a graphene oxide-ammonia borane hybrid assembly is annealed at 1100 degrees C. (where the temperature increasing rate is 5 degrees C. per minute) for 12 hours, under an $N_2$ atmosphere, resulting in a graphene-hBN aerogel.

The annealing process may also include a second annealing at a second temperature of between 500 and 700 degrees C., such as at least 500, 550, or 600 degrees C., and no more than 700, 650, or 600 degrees C., including all subranges and combinations thereof. Generally, the second annealing process is done in the presence of a gas. In preferred embodiments, air is used. This second annealing is generally utilized with hBN aerogel synthesis, and is typically not utilized for forming aerogels with two-dimensional nanostructured materials, such as graphene-hBN aerogel nanoparticle synthesis. The primary purpose here is to remove any remaining hydrocarbon polymer colloids, e.g., polystyrene nanoparticles, thereby obtaining a porous hBN. aerogel structure.

The second annealing process is generally done for a second period of time that is between 3 and 12 hours, preferably between 5 and 8 hours, and most preferably around 6 hours.

The annealing process converts the ammonia borane to hexagonal boron nitride (hBN). In some embodiments, hBN nanosheets are produced, and those hBN nanosheets are polycrystalline.

In some embodiments, the annealing process also results in the doping of the supporting structure, and particularly a two-dimensional nanostructured material used for the supporting structure, with B and/or N atoms.

As shown in FIG. 1, annealed portions 132 of the aerogel 131 comprise hBN 133, which has been converted from the ammonia borane 111.

The annealing process can impact the support structure in different ways, depending on the material used to form the support structure and the temperatures of the annealing process. In some embodiments, e.g., when two-dimensional nanostructured materials with high melting points are used, annealed portions 132 (sometimes referred to as colloidal nanoparticles) of the aerogel 131 contains a two-dimensional nanostructured material 134 and hexagonal boron nitride (hBN) 133. In some embodiments, e.g., when hydrocarbon polymer colloids are used, the annealing process can cause, e.g., depolymerization and elimination of the colloid from the hybrid material. In these embodiments, each annealed portion 132 of the aerogel 131 includes a hexagonal boron nitride (hBN) 133 and a void 134 substantially equivalent in volume to the volume previously occupied by the hydrocarbon polymer colloid 122.

Figure 4:
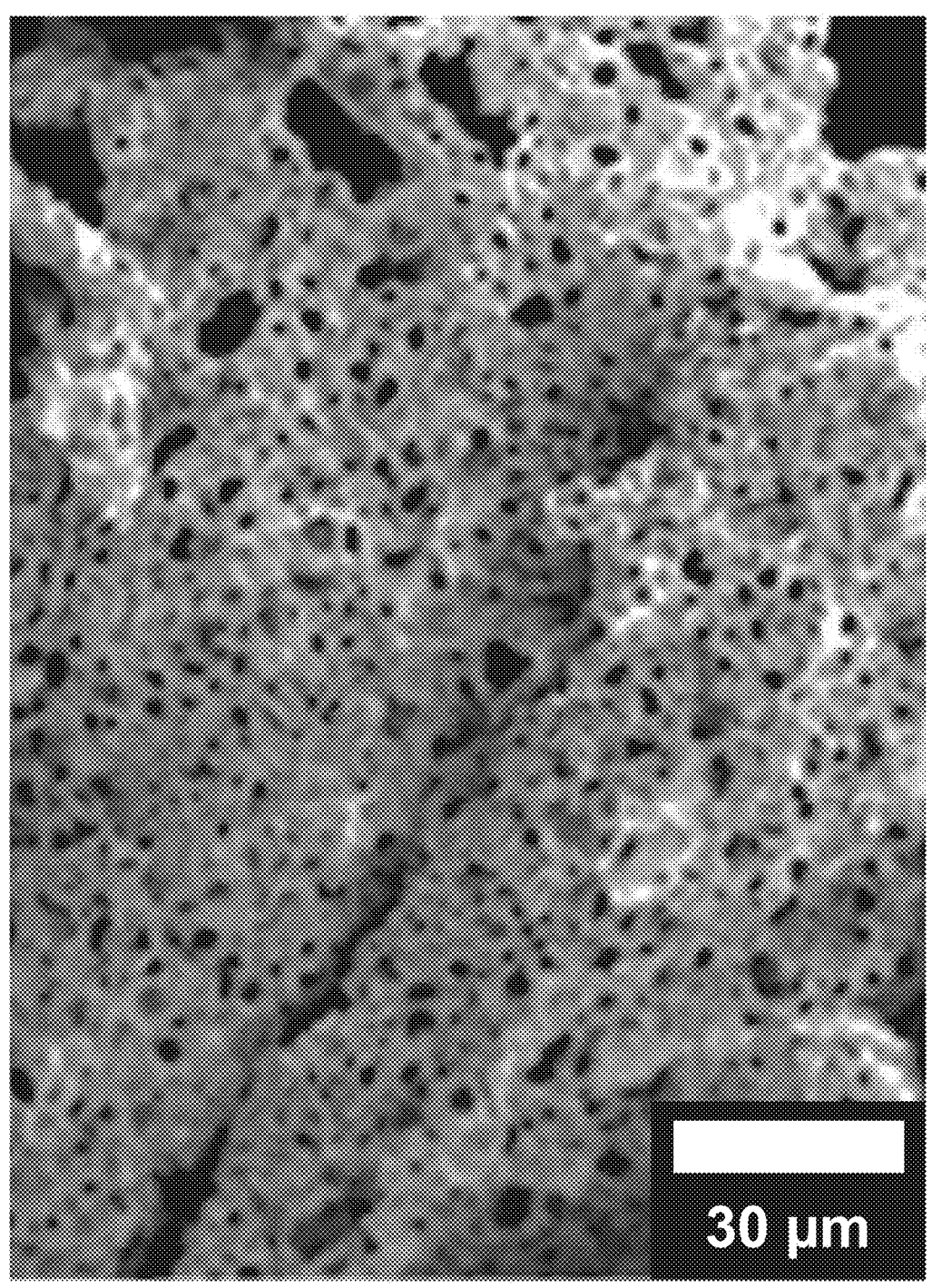
FIG. 4 is a Scanning Electron Microscope image of an hBN aerogel.
Figure 5:
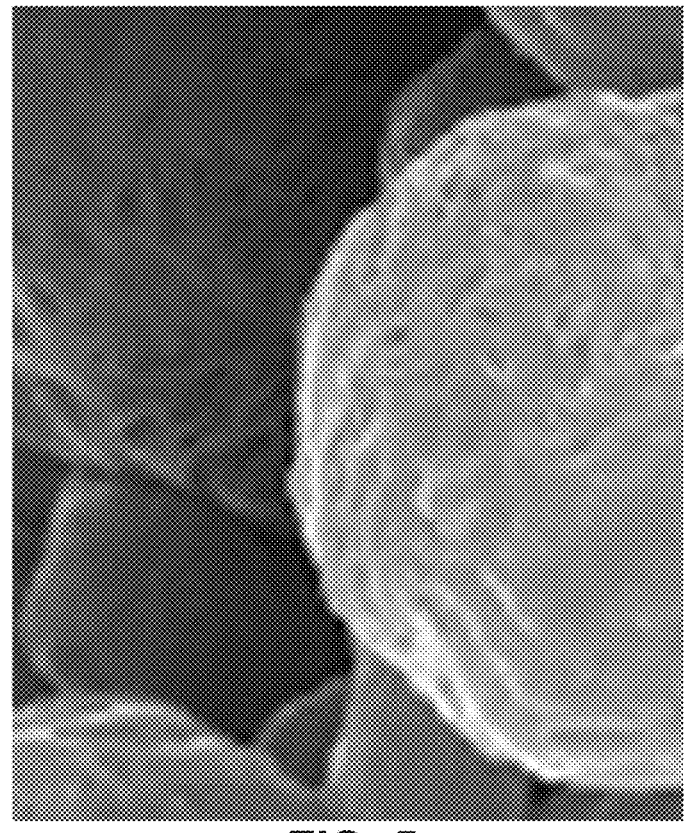
FIG. 5 is a Scanning Electron Microscope image, focusing on a graphene-hBN particle.

Thus, in some embodiments, the formed aerogel comprises or consists of hBN 133 (see, e.g., FIG. 4), while in other embodiments, the formed aerogel comprises or consists of a plurality of colloidal nanoparticles 132 each containing hBN 133 and two-dimensional nanostructured material 134 (see, e.g., FIG. 5).

The support structure (sometimes referred to as a "template") can help determine the structure of the final aerogel. For example, if spherical polymer colloids are used, the hBN structure will have generally spherical voids. If non-spherical polymer colloids are used, the hBN structure will have voids that generally pattern after the non-spherical shape. In some embodiments, only a single colloid shape is utilized, while in other embodiments, mixtures of colloid shapes are used.

The aerogels will generally be highly porous, and will typically have rough surfaces with nanoporosity.

Referring back to FIG. 1, optionally, the method 100 may also include altering at least one property of the aerogel by allowing 140 at least one chemical agent 142, such as polydimethylsiloxane (PDMS), to infiltrate the aerogel 141. That is, the properties of aerogels can be tuned by incorporating infiltrated additives.

The properties of the aerogel generally includes physical properties such as density, mechanical properties such as compressive strength, yield strength, elasticity/flexibility, etc., as well as resistances and conductivities such as chemical or heat resistance, thermal or electrical conductivity, etc.

Prior to allowing the chemical agent to infiltrate the aerogel, the aerogels may, e.g., be degassed under vacuum at 100 degrees C. for, e.g., 30 min to remove moisture for better wetting between the aerogel and the chemical agent. The infiltration may be accomplished by any appropriate method known to skilled artisans, including, e.g., immersing the aerogel in the chemical agent, or spraying or otherwise depositing the chemical agent on the aerogel, and then allowing capillary action to draw the agent into the pores of the aerogel. In other embodiments, vacuum suction is used to draw the chemical agent into the aerogels.

The chemical agents can include any appropriate chemical agent known to skilled artisans. Preferably, the chemical agent comprises a liquid. In some embodiments, the chemical agent is a silicone or silicone-based polymer.

Figure 6:
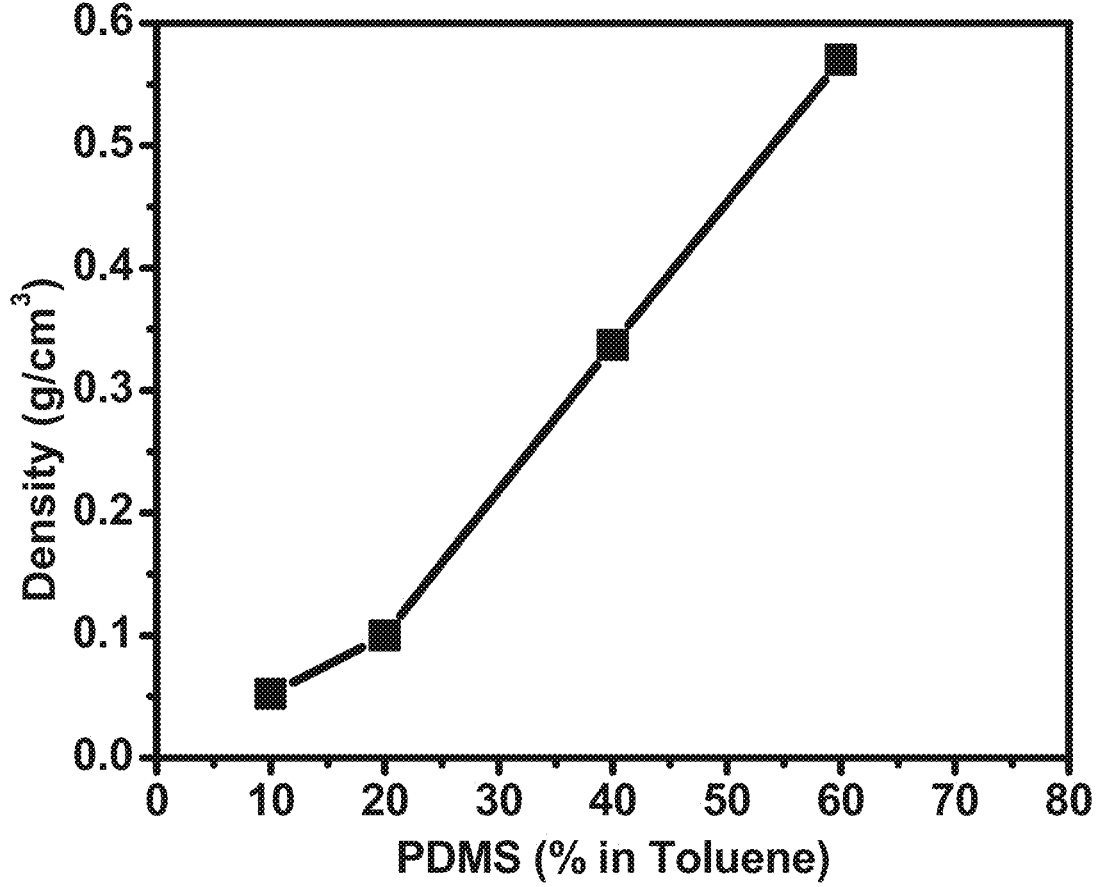
FIG. 6 is a graph illustrating the effect of PDMS in the aerogel on the density of the aerogel.

In some embodiments, the aerogel density is affected when the chemical agent infiltrates the aerogel. For example, as seem in FIG. 6, the density of the aerogel increases with increased quantities of PDMS infiltrating the aerogel. Specifically, for this example, PDMS was diluted with toluene to concentrations of 10%, 20%, 40% and 60% by weight in toluene. An hBN aerogel was then broken into separate aerogel portions, and each aerogel portion was immersed into one of the diluted PDMS solutions overnight (i.e., approximately 12 hours), and then cured at 100° C. for 2 hours.

In some embodiments, the aerogels become more flexible when the chemical agent infiltrates the aerogel. For example, one aerogel was unable to be folded in half without substantial changes to the aerogel structure (changes in pore size, fractures of the structure, etc.). After PDMS was introduced, the aerogel was able to be folded in half three times, and then unfolded, with no substantial changes to the aerogel structure.

In some embodiments, only a single chemical agent is utilized. In other embodiments, two or more chemical agents are introduced.

Thus, in some embodiments, the formed aerogel 141 comprises or consists of either hBN 133 or a plurality of colloidal nanoparticles 132 each containing hBN 133 and two-dimensional nanostructured material 134; and optionally one or more chemical agents 142.

In various embodiments, the two-dimensional nanostructured material is graphene, a transition metal dichalcogenide, or an MXene. In various embodiments, the aerogel comprises at least one additional additive (such as PDMS).

In various embodiments, the colloidal nanoparticle contains a polymer (which contains the two-dimensional nanostructured material), hexagonal boron nitride, or a combination thereof.

As is understood in the art, additional processing steps may be performed on the aerogel. For example, once formed, the aerogel may be compressed to reduce (or eliminate) its porosity. Alternatively, or in addition, the aerogel may be powdered to form an aerogel powder. It may be that the aerogel powder is subsequently mixed with a polymer and cast into a desired form (e.g., shape, size or pattern). In some embodiments, the aerogel powder is mixed with an adhesive, solvent, or combination thereof. In some embodiments, a catalyst or a catalyst precursor may be added to the aerogel to form an aerogel supported catalyst. The catalyst may comprise a transition metal, e.g., a transition metal selected from palladium, rhodium, ruthenium, platinum, nickel, copper, osmium etc. In some embodiments, these various techniques are further combined (e.g., an aerogel powder with a catalyst are dispersed in a solvent that may optionally contain a polymer or adhesive material.)

Optionally, the aerogel may be configured for use as a coating or as a structural component. For example, in some embodiments, an organosilicon material (such as PDMS or tetraethyl orthosilicate (TEOS)) is introduced into the aerogel to allow the aerogel to be used as an ultralight structural material. In other embodiments, an adhesive layer is added to one side of the aerogel to allow it to be attached to, e.g., a heat-sensitive component. In some embodiments, graphene oxide-hBN nanoparticles are dispersed in an appropriate solvent and coated on various surfaces for the desired applications such as fire-retardant, solar absorber, catalyst, electrode for energy storage, water purification, thermal platforms, etc. In some embodiments, the aerogels are used for mechanical damping, automotive, or aerospace applications.

The disclosed material can be employed a wide range of technological applications including, inter alia, energy storage and conversion in fuel cells, solar cells, and Li-ion batteries, supercapacitors, catalysis and catalyst support; sorption applications (e.g., $CO_2$, $H_2$), gas purification, separation technologies, drug delivery, environmental remediation, water desalination, purification, and separation, sensors, electronic, magnetic devices and thermal application.

In addition, the disclosed materials have a potential to be used in packaging, automotive industry, building insulation, thermal insulation, aerospace applications (e.g., high heat engine parts), and high-temperature applications, sound insulation, fire-safety applications thereof.

Example 1

An hBN aerogel was formed by mixing polystyrene colloids and solid ammonia borane, allowing to self-assemble, then annealing at 1100 degrees C. for 12 hours in nitrogen, followed by 600 degrees C. in air. The resulting hBN aerogel was ultralight-weight (~11 mg/cm3) and porous.

To illustrate the fire-resistant features of the aerogel, a propane flame torch (>1000° C.) experiment was employed, where the aerogel was exposed to the propane flame for 10 minutes. The structure remained stable and unmodified (to the human eye) after 10 min of flame exposure.

Scanning electron microscopy (SEM) characterization revealed that the microstructure of the hBN aerogel consisted of spherical pores due to the PS colloid template.

Example 2

Various graphene-hBN (g-hBN) aerogel nanoparticles were formed, as follows. First, mixtures of various ratios of GO and AB were combined and allowed to self-assemble, as follows: (i) 90% GO+10% AB; (ii) 70% GO+30% AB; (iii) 50% GO+50% AB; (iv) 30% GO+70% AB; and (v) 10% GO+90% AB.

After mixing, the hybrid samples are annealed at 1100° C. (5° C./min) for 12 hours under inert atmosphere. Then, polymer additives were infiltrated into the aerogel structure. Specifically for PDMS infiltration into the g-hBN, SYLGARD® 184 was diluted in toluene to a desired concentration (here, between 10% and 60%), and then each g-hBN aerogel was immersed into the diluted PDMS solution overnight (~12 hours) and then cured at 100° C. for 2 hours.

Those skilled in the art will recognize, or be able to ascertain using no more than routine experimentation, many equivalents to the specific embodiments of the invention described herein. Such equivalents are intended to be encompassed by the following claims.

What is claimed:

1. A method for creating an aerogel, comprising:
forming a mixture of solid ammonia borane and either (a) a two-dimensional nanostructured material or (b) hydrocarbon polymer colloids;
allowing the mixture to self-assemble to form a plurality of hybrid particles, where an average particle size of the plurality of hybrid particles is less than 30 μm; and
annealing the plurality of hybrid particles at a first temperature to form the aerogel.

2. The method according to claim 1, wherein the two-dimensional nanostructured material is graphene.

3. The method according to claim 1, wherein the two-dimensional nanostructured material is a transition metal dichalcogenide or an MXene.

4. The method according to claim 1, wherein the hydrocarbon polymer colloids are polystyrene.

5. The method according to claim 1, wherein the hydrocarbon polymer colloids are spherical.

6. The method according to claim 1, wherein the hydrocarbon polymer colloids are non-spherical.

7. The method according to claim 1,
wherein the two-dimensional nanostructured material is an oxide,
and further comprising determining a ratio of the oxide to the solid ammonia borane used to prepare the aerogel based on a target density of the aerogel.

8. The method according to claim 1, wherein the first temperature is between 1000 degrees C. and 1500 degrees C.

9. The method according to claim 8, wherein the annealing further comprises reducing the temperature to a second temperature of between 500 and 700 degrees C. and annealing at the second temperature in air.

10. The method according to claim 1, further comprising altering at least one property of the aerogel by allowing at least one chemical agent to infiltrate the aerogel.

11. The method according to claim 10, wherein the at least one chemical agent is polydimethylsiloxane.

12. The method according to claim 1, wherein a density of the aerogel is no more than about 11 mg/cm$^3$.

13. A method for creating an aerogel, comprising:
forming a mixture of solid ammonia borane and either (a) a two-dimensional nanostructured material or (b) hydrocarbon polymer colloids;
allowing the mixture to self-assemble to form a plurality of hybrid particles; and
annealing the plurality of hybrid particles at a first temperature of between 1000 degrees C. and 1500 degrees C., then reducing the temperature to a second temperature of between 500 and 700 degrees C. and annealing at the second temperature in air, to form the aerogel.

14. A method for creating an aerogel, comprising:
determining a ratio of an oxide which is a two-dimensional nanostructured material to ammonia borane used to prepare the aerogel based on a target density of the aerogel;
forming a mixture of solid ammonia borane and
the oxide which is the two-dimensional nanostructured material;
allowing the mixture to self-assemble to form a plurality of hybrid particles; and
annealing the plurality of hybrid particles at a first temperature to form the aerogel.

* * * * *